// United States Patent [15] 3,640,871
Kawamata et al. [45] Feb. 8, 1972

[54] TELLURIUM-IRON MODIFIED CHROMIUM DIOXIDES

[72] Inventors: Tadashi Kawamata; Eiichi Hirota; Toshihiro Mihara; Yukio Terada, all of Osaka, Japan

[73] Assignee: Matsushita Electric Industrial Co., Ltd., Kadoma, Osaka, Japan

[22] Filed: Oct. 22, 1970

[21] Appl. No.: 83,167

[30] Foreign Application Priority Data

Oct. 27, 1969 Japan....................44/86295
Oct. 29, 1969 Japan....................44/87042

[52] U.S. Cl.....................252/62.51
[51] Int. Cl.....................C04b 35/12
[58] Field of Search.....................252/62.51; 23/145

[56] References Cited

UNITED STATES PATENTS

| | | | |
|---|---|---|---|
| 2,923,684 | 2/1960 | Ingraham | 252/62.51 |
| 3,034,988 | 3/1962 | Ingraham et al. | 252/62.51 |
| 3,243,260 | 3/1966 | Kubota et al. | 252/62.51 X |
| 3,423,320 | 1/1969 | Balthis | 252/62.51 |
| 3,547,823 | 12/1970 | Mihara et al. | 252/62.51 |
| 3,547,824 | 12/1970 | Mihara et al. | 252/62.51 |

*Primary Examiner*—Tobias E. Levow
*Assistant Examiner*—J. Cooper
*Attorney*—Wenderoth, Lind & Ponack

[57] ABSTRACT

Tellurium-iron modified chromium dioxide having a higher magnetic coercive force is obtained by a combined addition of tellurium and iron.

When said magnetic recording powder consists essentially of 20 to 99.98 atomic percent of chromium, 0.01 to 20 atomic percent of tellurium and 0.01 to 60 atomic percent of iron, the intrinsic coercive force is higher than 400 Oersteds. The coercive force of tellurium-iron modified chromium dioxide is increased by further addition of 0.1 to 15 atomic percent of tin.

These ferromagnetic chromium dioxide powders have high coercive force and saturation magnetization. Each particle of the powders is in a uniform acicular shape and is useful in magnetic recording media.

4 Claims, No Drawings

TELLURIUM-IRON MODIFIED CHROMIUM DIOXIDES

This invention relates to magnetic oxide powder for use in magnetic recording. More particularly the invention relates to ferromagnetic chromium dioxide powder having a high-coercive force and a high-saturation magnetization. Such powder is suitable for tapes, discs and drums in the high-density recording, and is especially suitable for master tapes in magnetic duplication.

Recent developments in high-density recording require a magnetic oxide powder having a high-magnetic coercive force and saturation magnetization. For this purpose various magnetic powders have been invented, for example, a magnetic iron oxide powder doped with cobalt and ferromagnetic chromium dioxide powders modified with tellurium or antimony. These chromium dioxide powders are in an acicular shape and have a high coercive force, Hc, along with high-remanent magnetization, Br. Therefore, a magnetic tape comprising the chromium dioxide exhibits high-performance characteristics and, therefore, excellent characteristics as master tape in magnetic duplication are to be expected. In magnetic duplication, a master tape must have a larger coercive force than that of a slave tape. It is desirable that magnetic recording powder for master tape in duplication have a coercive force larger than 600 oersteds.

Since S. M. Ariya et al., have succeeded in obtaining pure chromium dioxide by the thermal decomposition of chromium trioxide under high oxygen pressure, many studies have been carried out to develop a suitable powder for magnetic recording. For example, U.S. Pat. No. 2,923,683 describes that an antimony modified chromium dioxide has a high-coercive force of 400 oersteds. U.S. Pat. No. 3,234,260 shows that the tellurium modified chromium dioxide has a high-coercive force of 390 oersteds. U.S. Pat. 2,923,684 describes that the tin-modified chromium dioxide has a coercive force of 250 oersteds. Pure chromium dioxide has comparatively low-Curie temperature of 116° C. The Curie temperature of the chromium dioxide increases with addition of iron. Therefore, the combined addition of iron and antimony results in a chromium dioxide having a coercive force of about 400 oersteds and a Curie temperature higher than 116° C. as described in U.S. Pat. 3,034,988.

An object of the present invention is to provide ferromagnetic chromium dioxide powder having high-coercive force and saturation magnetization for use in a high-density recording. The chromium dioxide powder of this invention has a higher coercive force than that of prior chromium dioxide powders. The chromium dioxide powder of the present invention has a coercive force higher than 400 oersteds and a saturation magnetization larger than 60 emu/g.

Another object of this invention is to provide a ferromagnetic chromium dioxide powder having a higher coercive force than 600 oersteds along with high-saturation magnetization. Such powder is suitable for a master tape in magnetic duplication.

According to the present invention, the ferromagnetic chromium dioxide powder having high-coercive force and high-saturation magnetization is provided by using additives of tellurium and iron simultaneously in its manufacture. The chromium dioxide powder of this invention includes constituents consisting essentially of 20 to 99.98 percent of chromium, 0.01 to 20 percent of tellurium and 0.01 to 60 percent of iron in an atomic percentage.

Particularly, the chromium dioxide powder consisting essentially of an atomic percent of 65 to 99.98 percent of chromium, 0.01 to 15 percent of tellurium and 0.01 to 20 percent of iron has a coercive force higher than 400 oersteds and a higher saturation magnetization than 60 emu/g. at room temperature.

More particularly, the chromium dioxide powder consisting essentially of an atomic percent of 20 to 84 percent of chromium, 1 to 20 percent of tellurium and 15 to 60 percent of iron has a coercive force higher than 600 oersteds along with a high-saturation magnetization.

It has been discovered according to the present invention that ferromagnetic chromium dioxide powders with combined additives of tellurium, iron and tin have a higher coercive force than that of the chromium dioxide powder with only additives of tellurium and iron. The chromium dioxide powder containing further additives of 0.1 to 15 atomic percent of tin has a coercive force of 50 to 300 oersteds higher than that of the tellurium and iron modified chromium dioxide powders. The chromium dioxide powders with combined additives of tellurium, iron and tin consist essentially of 50 to 99.88 atomic percent of chromium, 0.01 to 15 atomic percent of tellurium, 0.01 to 20 atomic percent of iron and 0.1 to 15 atomic percent of tin. The chromium dioxide powder consisting essentially of 55 to 99.88 atomic percent of chromium, 0.01 to 15 atomic percent of tellurium, 0.01 to 20 atomic percent of iron and 0.1 to 10 atomic percent of tin has a superior coercive force higher than 500 Oe and a higher saturation magnetization than 60 emu/g. at room temperature.

The atomic percent referred to herein is based on a sum of chromium, tellurium and iron or of chromium, tellurium, iron and tin, and, therefore, should be 100 atomic percent when all atomic percent of constituent metallic atoms are added.

The chromium dioxides of this invention are prepared by mixing intimately chromium trioxide, metallic tellurium or any available and suitable tellurium compound, metallic iron or any available and suitable iron compound and metallic tin or any available and suitable tin compound so as to obtain the desired atomic percent of the constituent metal atoms and heating the mixture at a temperature of 280° to 480° C. in an autoclave under a high pressure as set forth hereinafter.

Advantageous tellurium compounds are $TeO_2$, $TeO_3$, $H_2TeO_4$, $H_6TeO_6$, $Na_2TeO_4$, $K_2TeO_4$. Among these compounds, those where the tellurium is in hexavalent state, i.e., $H_6TeO_6$ or $TeO_3$ are preferable. Operable iron compounds are $Fe_2O_3$, $Fe_3O_4$, $Fe(OH)_3$, $Fe(NO_3)_3$, $FeSO_4$, $Fe(SO_4)_3$, FeS,$Fe(CrO_4)$and $Fe_2(Cr_2O_7)_3$. Operable tin compounds are $SnO$, $SnO_2$, $H_2SnO_3$, $SnSO_4$, $Sn(COO)_2$ and $Sn(C_2H_3O_2)_2$. Among these tin compounds, the most preferable is $H_2SnO_3$.

The mixture with a small amount of water is put into a platinum or a stainless steel crucible. The mixture in the crucible is put in an autoclave which is made of a corrosion-resistant metal such as stainless steel and which is provided with a thermocouple for measuring the reaction temperature and with a pressure gauge. The autoclave having the mixture therein can be heated by any suitable method, such as by an electric heater, while the temperature of the mixture is being measured. After reaching the reaction temperature, the mixture is maintained at the temperature for a suitable time period which depends on the reaction pressure and temperature, and is then cooled to room temperature in the autoclave. After having cooled, the mixture is removed from the autoclave, washed with distilled water and dried by any suitable method.

The coercive force (Hc) is derived from the magnetization versus magnetic field curves which are measured at maximum field of 3,000 oersteds by using conventional method. The saturation magnetization at room temperature is measured by a magnetic balance which was described in the publication by Hirone et al., (Sci. Rep. RITU 6A (1954)67).

The following examples are meant to be illustrative preferred embodiments of the invention, but not meant to limit the scope thereof.

EXAMPLE 1

To ferromagnetic chromium dioxide powders are added 0.01 to 20 atomic percent of tellurium and 0.01 to 60 atomic percent of iron as set forth in the following process. Five grams of chromium trioxide, 0.0019 to 4.600 g. of telluric acid and 0.0004 to 7.985 g. of $Fe_2O_3$ are mixed uniformly so as to have compositions of additives listed in Table 1. Each mixture is put into a platinum crucible and 1 milliliter of water is added thereto. The mixture in the crucible is placed into an autoclave having an inner volume of 30 milliliters. The autoclave is closed and placed in an electric furnace of 30 cm. diameter. The autoclave is also connected, through a high-pressure tube of stainless steel, to a high-pressure controlling system comprising a pressure gauge, a pressure head for automatic recording apparatus and a leak bulb. Oxygen is introduced into the autoclave up to a pressure of 120 kg./cm.$^2$ at room temperature. The autoclave is heated up at a rate of 100° C. per hour to the temperature of 350° C. and maintained at the temperature for 2 hours. The inner pressure of the autoclave at 350° C. is about 350 kg./cm.$^2$. After heating, the autoclave is slowly cooled to room temperature. The pressure is then released. The reaction product is removed from the autoclave and rinsed with distilled water. The product is a black and magnetic powder, and is dried at a temperature below 150° C.

Table 1 shows the coercive forces of the obtained powders as functions of added amounts of tellurium and iron.

Table 1

Coercive forces of chromium dioxide including various amounts of tellurium and iron.

| Te(atomic %) | Fe(atomic %) | Hc(oersteds) |
|---|---|---|
| 0.01 | 40 | 470 |
| 1 | 15 | 460 |
| 3 | 20 | 540 |
| 5 | 25 | 600 |
| 5 | 40 | 625 |
| 10 | 40 | 730 |
| 10 | 60 | 470 |
| 15 | 25 | 410 |
| 20 | 30 | 400 |
| 3 | 8 | 430 |
| 3 | 0.01 | 400 |

Example 2

Chromium dioxide powders having a coercive force higher than 400 oersteds and saturation magnetization higher than 60 emu/g. are obtained by the following process. The mixtures of chromium trioxide, telluric acid and $Fe_2O_3$ are prepared so as to have additive compositions shown in Table 2. The mixtures are treated by similar way as described in Example 1. The obtained chromium dioxide powders have magnetic properties listed in Table 2.

Table 2

| Additives | | | |
|---|---|---|---|
| Te(atomic %) | Fe(atomic %) | Hc(oersteds) | σs(emu/g.) |
| 0.5 | 15 | 440 | 69 |
| 1 | 10 | 440 | 71 |
| 1 | 15 | 480 | 69 |
| 3 | 10 | 450 | 70 |
| 3 | 15 | 540 | 68 |

Example 3

Iron hydro-oxide is used as starting material of iron-addition. Five grams of chromium trioxide, 0.116 to 0.356 g. of telluric acid and 0.422 to 0.892 g. of iron hydro-oxide are mixed so as to have additive compositions listed in Table 3. The chromium dioxide powders are obtained by the same way as described in Example 1. The obtained powders have magnetic properties listed in Table 3.

Table 3

Magnetic properties of ferromagnetic chromium dioxide powder modified by tellurium and iron.

| Te(atomic %) | Fe(atomic %) | Hc(oersteds) | σs(emu/g.) |
|---|---|---|---|
| 1 | 7.5 | 470 | 71 |
| 1 | 12.0 | 510 | 64 |
| 1 | 15.0 | 570 | 62 |
| 3 | 7.5 | 550 | 73 |
| 3 | 12.0 | 600 | 62 |

Example 4

The chromium dioxide powder modified by tellurium of one atomic percent and iron of 10 atomic percent is further modified by adding 0.1 to 15 atomic percent of tin. Five grams of chromium trioxide, 0.129 to 0.155 g. of telluric acid, 0.449 to 0.540 g. of iron oxide and 0.0095 to 1.710 of metastannic acid are mixed so as to have additive compositions listed in Table 4. Each of mixtures is treated by the same way as described in Example 1.

The obtained powders have coercive forces listed in Table 4. Comparing with Table 2 and 4, further addition of tin increases the coercive force of chromium dioxide powders as clearly seen in Table 4.

Table 4

Coercive force of chromium dioxide 1 atomic % of tellurium, 10 atomic % of iron and various amounts of tin.

| Te (atomic %) | Fe (atomic %) | Sn (atomic %) | Hc (oersteds) | Hc (oersteds)* |
|---|---|---|---|---|
| 1 | 10 | 0.1 | 640 | 200 |
| 1 | 10 | 0.3 | 630 | 190 |
| 1 | 10 | 0.5 | 600 | 160 |
| 1 | 10 | 1 | 640 | 200 |
| 1 | 10 | 3 | 680 | 240 |
| 1 | 10 | 5 | 700 | 260 |
| 1 | 10 | 10 | 640 | 200 |
| 1 | 10 | 15 | 600 | 160 |

*Hc = (Hc value of column 4) −440 oe, the 440 oe is a coercive force of 1 at. % Te and 10 at. % Fe-modified chromium dioxide powder listed in the second row of Table 2.

Example 5

Twenty grams of chromium trioxide, 0.229 g. of telluric acid, 0.242 to 1.263 g. of $Fe_2O_3$ and 0.170 to 0.343 g. of metastannic acid are mixed so as to have additive compositions listed in Table 5. Each of mixtures are treated substantially as described in Example 1. The maximum reaction pressure in the preparation is about 400 kg./cm.$^2$.

The obtained chromium dioxide powders have excellent magnetic properties listed in Table 5. The powders have excellent higher coercive force and saturation magnetization in excess of 600 oersteds and 75 emu/g.

Table 5

Magnetic properties of chromium dioxide powders modified by tellurium, iron, and tin.

| Te (atomic %) | Fe (atomic %) | Sn (atomic %) | Hc (oersteds) | σs (emu/g.) |
|---|---|---|---|---|
| 0.5 | 1.5 | 0.5 | 600 | 80 |
| 0.5 | 3.0 | 0.5 | 640 | 74 |
| 0.5 | 4.5 | 0.5 | 670 | 76 |
| 0.5 | 6.0 | 0.5 | 630 | 76 |
| 0.5 | 7.5 | 0.5 | 650 | 75 |
| 0.5 | 1.5 | 1 | 640 | 76 |

| | | | | |
|---|---|---|---|---|
| 0.5 | 3.0 | 1 | 645 | 81 |
| 0.5 | 4.5 | 1 | 665 | 76 |
| 0.5 | 6.0 | 1 | 660 | 76 |
| 0.5 | 7.5 | 1 | 610 | 73 |

The embodiments of the invention in which exclusive property or privilege is claimed are defined as follows:

1. A ferromagnetic chromium dioxide powder having a combination of tellurium and iron incorporated therewith, said powder based on the specified metals, consisting essentially of 20 to 99.98 atomic percent of chromium, 0.01 to 20 atomic percent of tellurium and 0.01 to 60 atomic percent of iron.

2. A ferromagnetic chromium dioxide powder according to claim 1, wherein said powder, based on the specified metals consists essentially of 65 to 99.98 atomic percent of chromium, 0.01 to 15 atomic percent of tellurium and 0.01 to 20 atomic percent of iron.

3. A ferromagnetic chromium dioxide powder according to claim 1, wherein said powder, based on the specified metals, consists essentially of 20 to 84 atomic percent of chromium, 1 to 20 atomic percent of tellurium and 15 to 60 atomic percent of iron.

4. A ferromagnetic chromium dioxide powder according to claim 1, wherein said powder based on its metal content, consists essentially of 50 to 99.88 atomic percent of chromium, 0.01 to 15 atomic percent of tellurium, 0.01 to 20 atomic percent of iron and 0.1 to 15 atomic percent of tin.

* * * * *